United States Patent
Ohisa et al.

(10) Patent No.: US 10,221,778 B2
(45) Date of Patent: Mar. 5, 2019

(54) ENGINE CONTROL DEVICE

(71) Applicant: Mazda Motor Corporation, Aki-gun, Hiroshima (JP)

(72) Inventors: Chikako Ohisa, Aki-gun (JP); Osamu Sunahara, Hiroshima (JP); Daisuke Umetsu, Hiroshima (JP); Takahiro Kawamura, Aki-gun (JP); Yasunori Takahara, Hiroshima (JP); Daisaku Ogawa, Hiroshima (JP); Takeatsu Ito, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 55 days.

(21) Appl. No.: 15/338,106

(22) Filed: Oct. 28, 2016

(65) Prior Publication Data
US 2017/0145940 A1 May 25, 2017

(30) Foreign Application Priority Data

Nov. 20, 2015 (JP) ................................. 2015-227828

(51) Int. Cl.
G06F 19/00 (2018.01)
F02D 11/10 (2006.01)
(Continued)

(52) U.S. Cl.
CPC ........... F02D 11/105 (2013.01); B60W 30/16 (2013.01); F02D 37/02 (2013.01); F02D 41/021 (2013.01);
(Continued)

(58) Field of Classification Search
CPC ...... F02D 11/105; F02D 37/02; F02D 41/021; F02D 2200/501; F02D 2200/60;
(Continued)

(56) References Cited

U.S. PATENT DOCUMENTS

| 5,243,526 A | * | 9/1993 | Ito ........................ B60K 28/16 |
| | | | 180/177 |
| 5,285,390 A | * | 2/1994 | Haseda ................. B62D 7/159 |
| | | | 180/422 |

(Continued)

FOREIGN PATENT DOCUMENTS

| JP | 2011088576 A | | 5/2011 | |
| JP | 2012086770 A | * | 5/2012 | ......... Y02T 10/6221 |

(Continued)

Primary Examiner — Hung Q Nguyen
Assistant Examiner — Anthony Donald Taylor, Jr.
(74) Attorney, Agent, or Firm — Alleman Hall Creasman & Tuttle LLP

(57) ABSTRACT

An engine control device for controlling an engine based on a vehicle operating state is provided, that includes a basic target torque determinator for setting a vehicle target acceleration based on an accelerator pedal operation and determining a basic target engine torque based on the vehicle target acceleration, a torque reduction demand determinator for determining whether an engine torque reduction is demanded based on the vehicle operating state other than the accelerator pedal operation, a torque reduction amount determinator for determining an engine torque reduction amount according to the operating state when the torque reduction is demanded, a final target torque determinator for determining as a final target torque an engine torque calculated by subtracting the torque reduction amount from the basic target torque when the torque reduction is demanded, and an engine controller for controlling the engine so as to output the final target torque.

3 Claims, 7 Drawing Sheets

(51) Int. Cl.
  *B60W 30/16* (2012.01)
  *F02D 41/02* (2006.01)
  *F02D 37/02* (2006.01)
(52) U.S. Cl.
  CPC .... *F02D 2200/501* (2013.01); *F02D 2200/60* (2013.01); *F02D 2200/602* (2013.01); *F02D 2250/18* (2013.01); *F02D 2250/26* (2013.01)
(58) Field of Classification Search
  CPC .......... F02D 2200/602; F02D 2250/18; F02D 2250/26; B60W 30/16
  USPC ........................................ 701/110
  See application file for complete search history.

(56) References Cited

U.S. PATENT DOCUMENTS

| | | | | |
|---|---|---|---|---|
| 5,742,507 | A * | 4/1998 | Eckert | B60K 31/00 180/197 |
| 5,996,724 | A * | 12/1999 | Shimizu | B62D 6/00 180/446 |
| 8,725,382 | B2 * | 5/2014 | Soejima | F02P 5/14 701/84 |
| 9,067,601 | B2 * | 6/2015 | Itabashi | B60W 10/06 |
| 9,889,846 | B2 * | 2/2018 | Sunahara | B60W 30/045 |
| 2004/0088097 | A1 * | 5/2004 | Fujinami | B60T 7/22 701/70 |
| 2006/0142924 | A1 * | 6/2006 | Nakagawa | F02D 41/1497 701/110 |
| 2012/0061167 | A1 * | 3/2012 | Henry | G01L 5/221 180/444 |
| 2012/0209489 | A1 * | 8/2012 | Saito | B60T 7/042 701/70 |
| 2014/0046572 | A1 * | 2/2014 | Jang | F02D 45/00 701/102 |
| 2015/0352978 | A1 * | 12/2015 | Hashizaka | B60L 15/2036 701/22 |
| 2016/0031442 | A1 * | 2/2016 | Brockley | B60W 50/06 701/54 |
| 2016/0039415 | A1 * | 2/2016 | Brockley | B60W 50/06 701/94 |

FOREIGN PATENT DOCUMENTS

| | | |
|---|---|---|
| JP | 2014166014 A | 9/2014 |
| JP | 2015085823 A | 5/2015 |

* cited by examiner

ENGINE CONTROL DEVICE

BACKGROUND

The present invention relates to an engine control device, and particularly to an engine control device which controls an engine based on an operating state of a vehicle.

Conventionally, it is known that devices which control the behavior of a vehicle to the safe side when the behavior of the vehicle becomes unstable due to a slip etc. (such as an antiskid brake system or ABS, etc.). Particularly, it is known that devices which detect a behavior such as an understeering or an oversteering occurs on the vehicle during cornering etc. of the vehicle, and give wheels a suitable deceleration so that the behavior is controlled.

Meanwhile, JP2011-088576A discloses a vehicle movement controller which adjusts a deceleration during cornering to adjust a load applied to front wheels which are steerable wheels so that a series of vehicle operator's operations (breaking, steering-in, accelerating, steering-back, etc.) during cornering of a vehicle in a normal traveling state are natural and stable, unlike the control described above for a safety improvement in the traveling state where the behavior of the vehicle becomes unstable.

Furthermore, JP2014-166014A discloses a behavior control device for a vehicle which reduces a driving force of the vehicle according to a yaw-rate related amount corresponding to an operator's steering operation (e.g., yaw acceleration) to quickly decelerate the vehicle when the operator starts the steering operation so that a sufficient load is quickly applied to the front wheels which are steerable wheels. According to this behavior control device, since a frictional force between the front wheels and the road surface increases, and a cornering force of the front wheels increases by quickly applying the load to the front wheels when the steering operation is activated, a turnability of the vehicle in an early stage of curve entry improves, and a response to the steering-in operation improves. This achieves a vehicle behavior just as the operator intended.

It is known that a following travel control device which follows a vehicle after a preceding vehicle as one of driving support devices in order to ease operational burden of the operator. This following travel control device controls a driving force in order to accelerate or decelerate the vehicle so that a distance between two cars is kept constant.

The vehicle behavior control device disclosed in JP2014-166014A controls the driving force of the vehicle to be quickly reduced according to a steering operation, in order to accurately achieve a vehicle behavior which the operator intended.

The control of the driving force by the following travel control device competes with the control of the driving force according to the steering operation by the vehicle behavior control device disclosed in JP2014-166014A. For this reason, the cornering force of the front wheels cannot fully be increased by quickly applying the load to the front wheels unless the driving force control of the vehicle in response to the operator's steering operation is appropriately performed. Therefore, a sufficient response cannot be secured for the steering-in operation. That is, the vehicle behavior which the operator intended cannot accurately be achieved.

SUMMARY

The present invention is made in view of the above issues of the conventional technologies, and aims to provide an engine control device which can control an engine so that a vehicle behavior which a vehicle operator intended is accurately achieved, while appropriately cooperating with other driving force controls.

According to one aspect of the present invention, an engine control device for controlling an engine based on an operating state of a vehicle, is provided. The device includes a basic target torque determinator for setting a target acceleration of the vehicle based on an accelerator pedal operation and determining a basic target engine torque based on the target acceleration of the vehicle, a torque reduction demand determinator for determining an existence of a demand to reduce an engine torque based on the operating state of the vehicle other than the accelerator pedal operation, a torque reduction amount determinator for determining an engine torque reduction amount according to the operating state when the torque reduction demand is determined to exist, a final target torque determinator for determining as a final target torque an engine torque calculated by subtracting the torque reduction amount from the basic target torque when the torque reduction demand is determined to exist, and an engine controller for controlling the engine so as to output the final target torque.

With the above configuration, the final target torque determinator determines the final target torque based on the basic target torque determined based on the target acceleration of the vehicle, and the torque reduction amount determined based on the operating state of the vehicle other than accelerator pedal operation. In addition, the engine controller controls the engine so as to output the final target torque. Thus, change in the torque reduction amount can be reflected in the final target torque, regardless of what kind of driving operation or control of driving force is used for determining the basic target torque. Therefore, a load can quickly be applied to front wheels by controlling the engine so that the torque reduction amount is obtained with a high response with respect to the operating state of the vehicle other than accelerator pedal operation, and a vehicle behavior which a vehicle operator intended can accurately be achieved, while appropriately cooperating with other driving force controls.

The engine control device may further include a following travel control device for controlling a traveling speed of the vehicle in order to follow a preceding vehicle. When the torque reduction demand is determined to exist, even during the following control, the final target torque determinator may determine as the final target torque the engine torque calculated by subtracting the torque reduction amount from the basic target torque for the following control.

With the above configuration, the basic target torque determinator determines the basic target torque based on the target acceleration determined by a vehicle speed control device such as the following travel control device, the final target torque determinator determines the final target torque based on the basic target torque and the torque reduction amount determined based on the operating state of the vehicle other than accelerator pedal operation, and the engine controller controls the engine so as to output the final target torque. Thus, the vehicle behavior which the operator intended can accurately be achieved even when a vehicle speed control is performed by the following travel control device, etc.

The torque reduction amount determinator may determine the torque reduction amount according to a steering operation of the vehicle.

With the above configuration, change in the torque reduction amount with time which is determined based on the steering operation can be reflected in the change of the final target torque with time. Thus, the load can be applied to the front wheels by quickly adding deceleration according to the operator's steering operation to the vehicle, the response to the steering operation can be improved by quickly increasing a cornering force, and the engine can be controlled to accurately achieve the vehicle behavior which the operator intended while appropriately cooperating with other driving force controls.

According to another aspect of the present invention, an engine control device for controlling an engine based on an operating state of a vehicle, is provided. The device includes a basic target torque determinator for setting a target acceleration of the vehicle based on an accelerator pedal operation and determining a basic target engine torque based on the target acceleration of the vehicle, a change rate acquirer for acquiring a rate of change of a steering operation of the vehicle, a target additional deceleration setter for increasing a target additional deceleration while a rate of the increase becomes less as the change rate increases, a torque reduction amount determinator for determining an engine torque reduction amount according to the target additional deceleration when the torque reduction demand is determined, a final target torque determinator for determining as a final target torque an engine torque calculated by subtracting the torque reduction amount from the basic target torque when the torque reduction demand is determined to exist, and an engine controller for controlling the engine so as to output the final target torque.

DETAILED DESCRIPTION

Hereinafter, an engine control device according to one embodiment of the present invention is described with reference to the accompanying drawings.

Figure 1:
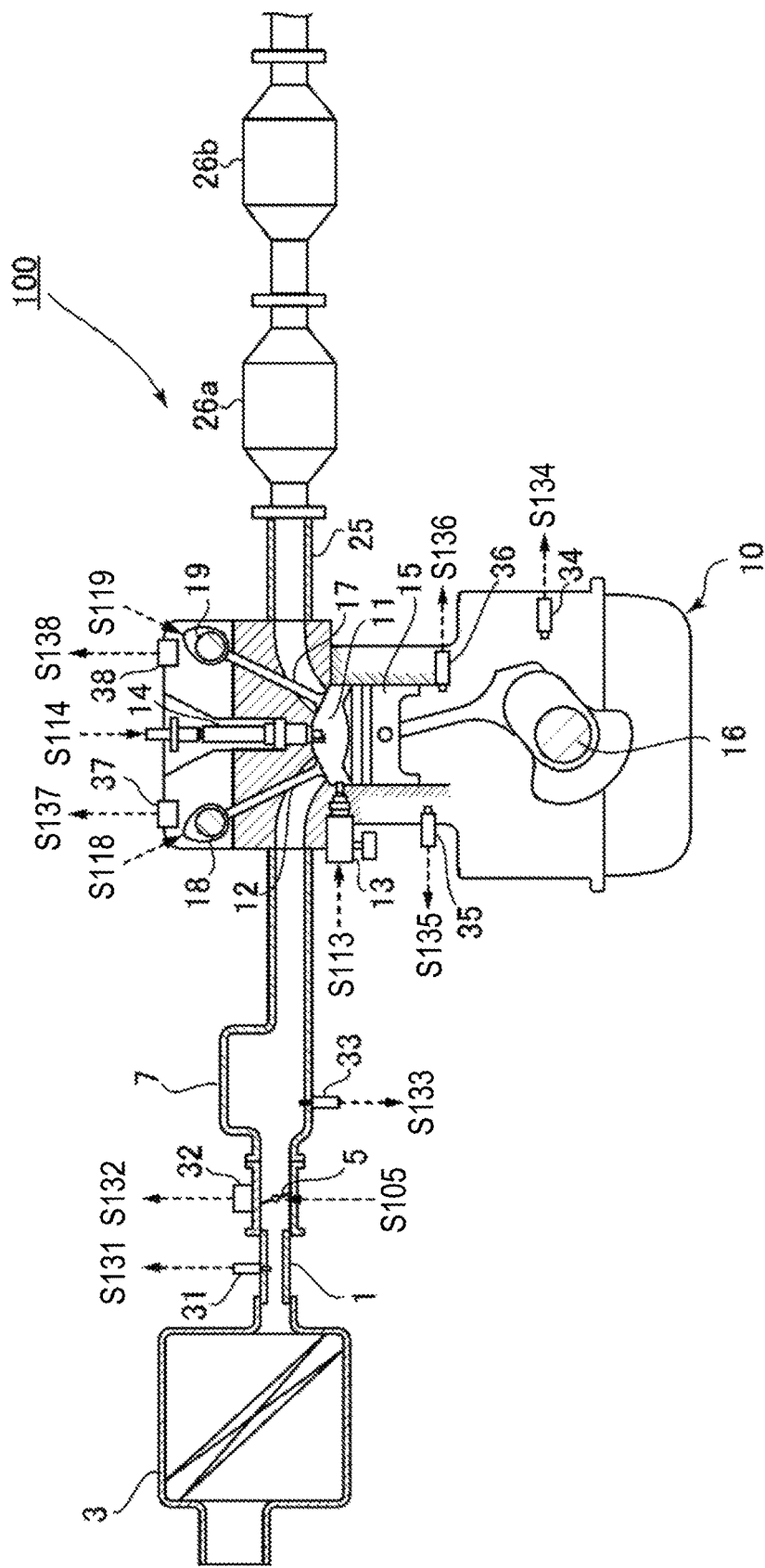
FIG. 1 is an outline configuration diagram of an engine system to which an engine control device according to one embodiment of the present invention is applied.

First, an engine system to which the engine control device according to the embodiment of the present invention is applied is described with reference to FIGS. 1 and 2. FIG. 1 is an outline configuration diagram of the engine system to which the engine control device according to this embodiment of the present invention is applied, and FIG. 2 is a block diagram illustrating an electric configuration of the engine control device according to this embodiment of the present invention.

Figure 2:
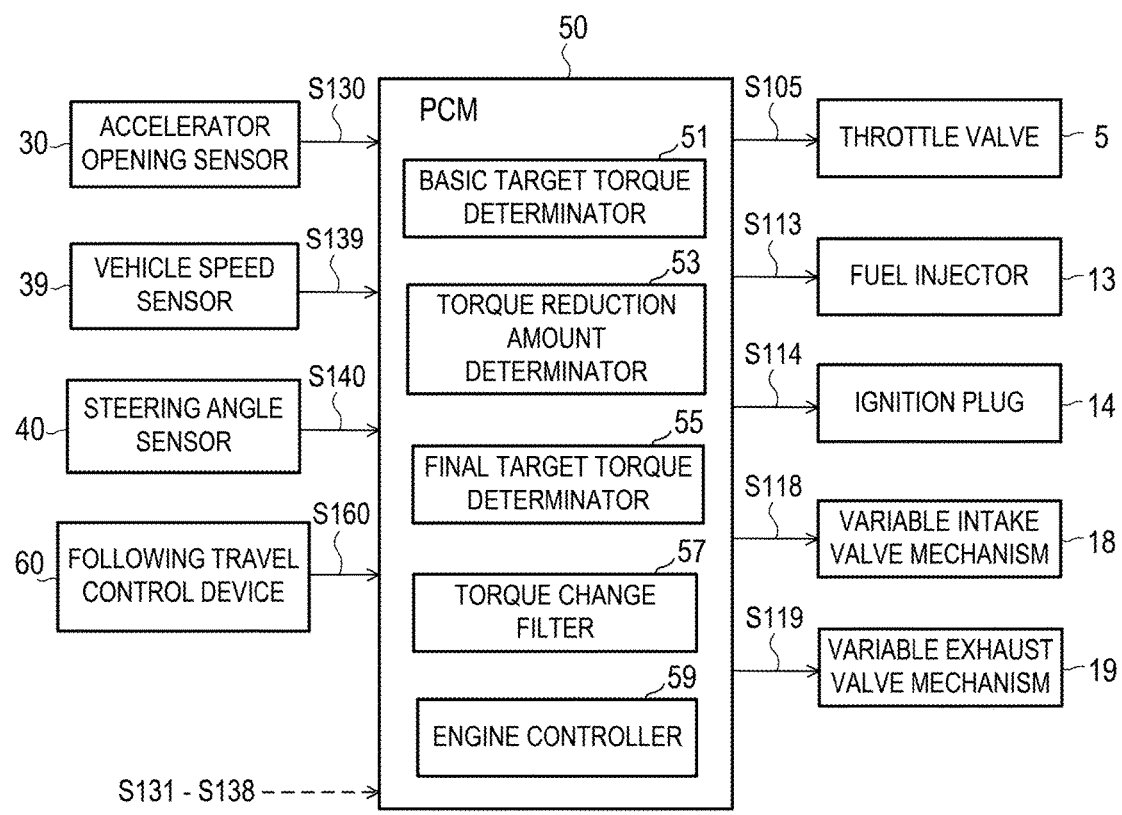
FIG. 2 is a block diagram illustrating an electric configuration of the engine control device according to the embodiment of the present invention.

As illustrated in FIGS. 1 and 2, the engine system 100 includes, primarily, an intake passage 1 through which intake air introduced from outside passes, the engine 10 (particularly, a gasoline engine) which combusts a mixture gas of the air supplied from the intake passage 1 and fuel supplied from a fuel injector 13 (described later) to generate a driving force for a vehicle, an exhaust passage 25 which discharges exhaust gas generated by combustion inside the engine 10, sensors 30-40 which detect various kinds of states regarding an engine system 100, and a PCM 50 (engine control device) which controls the entire engine system 100. It will be appreciated that the PCM 50 is a hardware device that includes a processor configured to execute various software programs stored in non-volatile memory of the PCM 50, including those software programs depicted at 51-59 in FIG. 2.

Provided in the intake passage 1 are, sequentially from upstream, an air cleaner 3 which purifies the intake air introduced from outside, a throttle valve 5 which adjusts an amount of passing intake air (intake air amount), and a surge tank 7 which temporarily stores the intake air supplied to the engine 10.

The engine 10 primarily includes an intake valve 12 which introduces the intake air supplied from the intake passage 1 into a combustion chamber 11, the fuel injector 13 which injects the fuel toward the combustion chamber 11, an ignition plug 14 which ignites the mixture gas of the intake air and the fuel which are supplied into the combustion chamber 11, a piston 15 which reciprocates by combustion of the mixture gas inside the combustion chamber 11, a crankshaft 16 which rotates by the reciprocating motion of the piston 15, and an exhaust valve 17 which discharges the exhaust gas generated by the combustion of the mixture gas inside the combustion chamber 11 to the exhaust passage 25.

Moreover, the engine 10 is configured such that a variable intake valve mechanism 18 and a variable exhaust valve mechanism 19 as a variable valve timing mechanism vary operating timings of the intake valve 12 and the exhaust valve 17 (corresponding to valve phases). The variable intake valve mechanism 18 and the variable exhaust valve mechanism 19 may adopt various types of well-known mechanisms. For example, the operating timings of the intake valve 12 and the exhaust valve 17 may be varied using the electromagnetic or hydraulic mechanisms.

Primarily provided in the exhaust passage 25 are exhaust purification catalysts 26a and 26b having a purification function of exhaust gas, such as a $NO_x$ catalyst, a three-way catalyst, or an oxidation catalyst. Below, if the exhaust purification catalysts 26a and 26b are used without distinguishing one from the other, they are comprehensively referred to as "the exhaust purification catalyst 26."

The engine system 100 is also provided with the sensors 30-40 which detect various kinds of states regarding the engine system 100. These sensors 30-40 are particularly as follows. The accelerator opening sensor 30 detects an accelerator opening which is an opening of an accelerator pedal (corresponding to a stepping-on amount of the accelerator pedal by a vehicle operator). The airflow sensor 31 detects the intake air amount corresponding to a flow rate of the intake air which passes through the intake passage 1. The throttle opening sensor 32 detects a throttle opening which is a valve opening of the throttle valve 5. The pressure sensor 33 detects an intake manifold pressure corresponding to a pressure of the intake air supplied to the engine 10. The crank angle sensor 34 detects a crank angle of the crankshaft 16. The water temperature sensor 35 detects a water temperature which is a temperature of coolant for cooling the engine 10. The temperature sensor 36 detects a cylinder temperature which is a temperature inside the cylinder of the engine 10. The cam angle sensors 37 and 38 detect operating timings including valve-close timings of the intake valve 12 and the exhaust valve 17, respectively. The vehicle speed sensor 39 detects a speed of the vehicle (vehicle speed). The steering angle sensor 40 detects a rotation angle of a steering wheel. Note that these various sensors 30-40 respectively output detection signals S130-S140 corresponding to detected parameters to the PCM 50.

The PCM 50 controls components of the engine system 100 based on the detection signals S130-S140 inputted from the various sensors 30-40. Particularly as illustrated in FIG. 2, the PCM 50 supplies the control signal S105 to the throttle valve 5 to control the open and close timings, and the throttle opening of the throttle valve 5, supplies the control signal S113 to the fuel injector 13 to control a fuel injection amount and a fuel injection timing, supplies the control signal S114 to the ignition plug 14 to control the ignition timing, and supplies the control signals S118 and S119 to the variable intake valve mechanism 18 and the variable exhaust valve mechanism 19 to control the operating timings of the intake valve 12 and the exhaust valve 17, respectively.

A control signal S160 corresponding to a target acceleration (including negative acceleration or deceleration) to follow the vehicle after a preceding vehicle is also inputted into the PCM 50 from a following travel control device 60 (a vehicle speed control device). For example, the following travel control device 60 detects a distance between two cars (the vehicle and the preceding vehicle which travels ahead of the vehicle), for example by a millimeter wave radar or a near-infrared laser radar, and sets the target acceleration for controlling the traveling speed so that the distance between the two cars is maintained at a given distance. If there is no preceding vehicle, the following travel control device 60 sets the target acceleration required in order to maintain the vehicle at a given traveling speed. The following travel control device 60 then outputs the control signal S160 of the target acceleration setting to the PCM 50.

The PCM 50 includes a basic target torque determinator 51 which determines a basic target torque based on the operating state of the vehicle including the accelerator pedal operation, a torque reduction amount determinator 53 which determines a torque reduction amount based on the operating state of the vehicle which does not include the accelerator pedal operation, a final target torque determinator 55 which determines a final target torque based on the basic target torque and the torque reduction amount, a torque change filter 57 which smoothes a change in the final target torque with time, and an engine controller 59 which controls the engine 10 so that the engine 10 outputs the final target torque.

Each component of the PCM 50 is comprised of a computer provided with a CPU, various kinds of programs to be interpreted and executed on the CPU (including primary control programs, such as OS and application programs which are activated on the OS and achieve specific functions), and an internal memory, such as a ROM and a RAM for storing the programs and various kinds of data.

Next, processings performed by the engine control device are described with reference to FIGS. 3 to 6.

Figure 3:
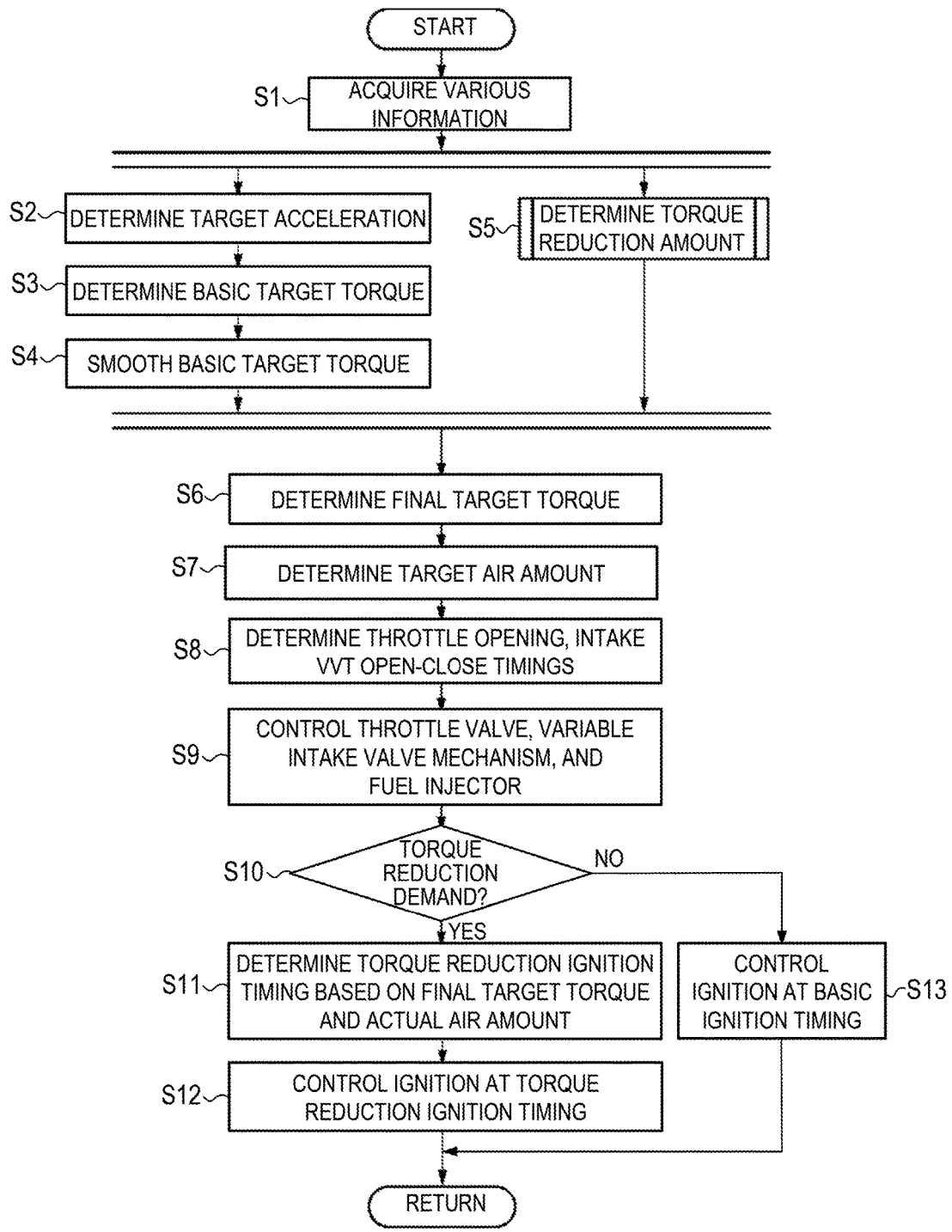
FIG. 3 is a flowchart of an engine control processing for controlling an engine by the engine control device according to the embodiment of the present invention.
Figure 4:
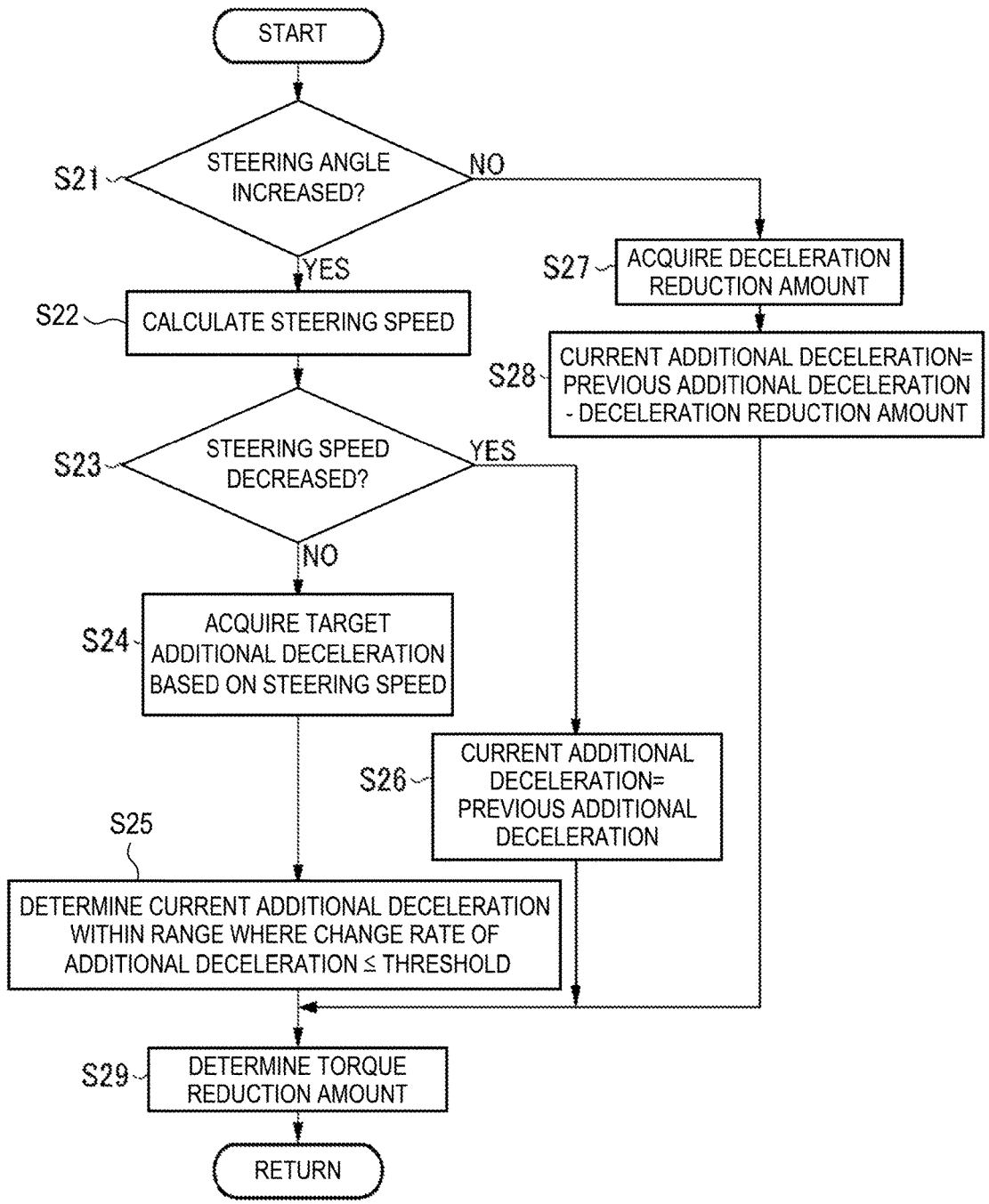
FIG. 4 is a flowchart of a torque reduction amount determination processing for determining a torque reduction amount by the engine control device according to the embodiment of the present invention.
Figure 5:
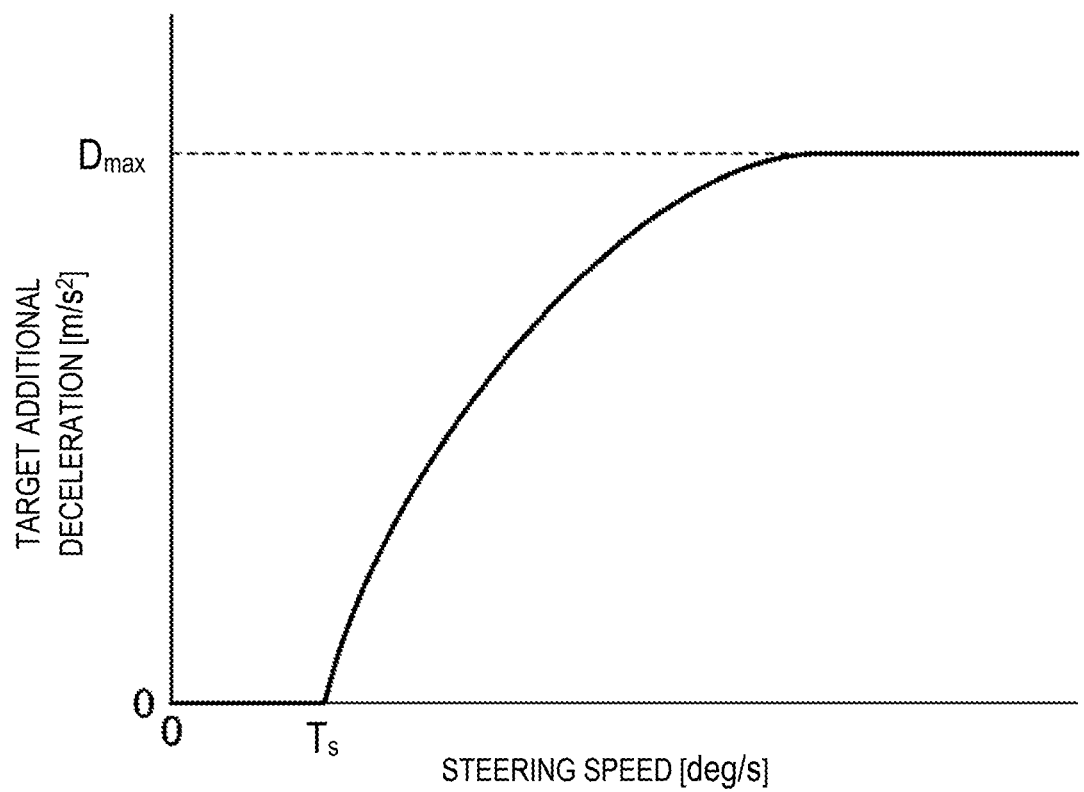
FIG. 5 is a map, illustrated in a form of a graph, in which a relation between a target additional deceleration and a steering speed determined by the engine control device according to the embodiment of the present invention is illustrated.
Figure 6:
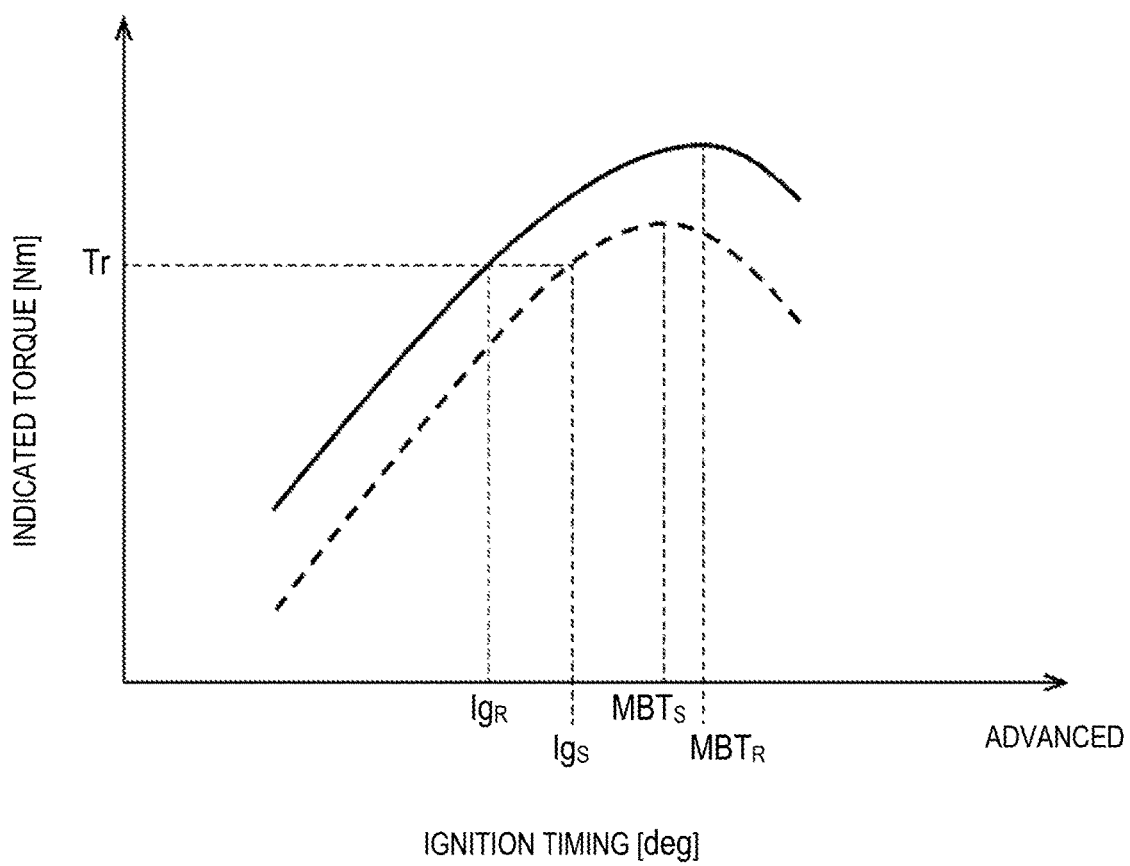
FIG. 6 is an ignition advance map, illustrated in a form of a graph, in which a relation between an ignition timing and an indicated torque is defined according to various air amounts and various engine speeds.

FIG. 3 is a flowchart of an engine control processing for controlling the engine 10 by the engine control device according to this embodiment of the present invention, FIG. 4 is a flowchart of a torque reduction amount determination processing for determining the torque reduction amount by the engine control device according to this embodiment of the present invention, FIG. 5 is a map in which a relation between a target additional deceleration and a steering speed determined by the engine control device according to this embodiment of the present invention is illustrated, and FIG. 6 is an ignition advance map in which the relation between the ignition timing and an indicated torque is defined according to various air amounts and various engine speeds.

The engine control processing of FIG. 3 is activated when an ignition switch of the vehicle is turned ON, and power is supplied to the engine control device. The engine control processing is repeatedly executed.

When the engine control processing is activated, as illustrated in FIG. 3, the PCM 50 acquires the operating state of the vehicle at Step S1. For example, the PCM 50 acquires, as the operating state, the accelerator opening detected by the accelerator opening sensor 30, the vehicle speed detected by the vehicle speed sensor 39, the steering angle detected by the steering angle sensor 40, the detection signals S130-S140 outputted from the various sensors 30-40 described above including a gear position currently set at a transmission of the vehicle, and the control signal S160 of the target acceleration outputted from the following travel control device 60, etc.

Next, at Step S2, the basic target torque determinator 51 of the PCM 50 sets the target acceleration based on the operating state of the vehicle including the accelerator pedal operation acquired at Step S1. For example, when the following travel control is not performed by the following travel control device 60, the basic target torque determinator 51 selects an acceleration characteristic map corresponding to the current vehicle speed and gear position from acceleration characteristic maps defined for various vehicle speeds and gear positions (they are created beforehand and stored in the memory etc.), and determines the target acceleration corresponding to the current accelerator opening while referring to the selected acceleration characteristic map. When the following travel control is performed by the following travel control device 60, the basic target torque determinator 51 determines a target acceleration specified by the control signal S160 inputted from the following travel control device 60 as the target acceleration.

Next, at Step S3, the basic target torque determinator 51 determines the basic target torque of the engine 10 for achieving the target acceleration determined at Step S2. In that case, the basic target torque determinator 51 determines the basic target torque within a torque range which is outputable by the engine 10, based on the vehicle speed, the gear position, a road surface slope, a road surface friction coefficient, etc. at this time point.

Next, at Step S4, the torque change filter 57 smoothes the change in the basic target torque with time determined at Step S3. The smoothing may be achieved by various known techniques, such as limiting a rate of change in the basic target torque to below a threshold, and calculating a moving average of the change in the basic target torque with time.

In parallel to the processings at Steps S2-S4, the torque reduction amount determinator 53 performs the torque reduction amount determination processing at Step S5 for determining the torque reduction amount based on the operating state of the vehicle other than the accelerator pedal operation. This torque reduction amount determination processing is described with reference to FIG. 4.

As illustrated in FIG. 4, once the torque reduction amount determination processing is activated, the torque reduction amount determinator 53 determines at Step S21 whether an absolute value of the steering angle acquired at Step S1 is increasing. As a result, if the absolute value of the steering angle is increasing, the processing then transits to Step S22 where the torque reduction amount determinator 53 calculates the steering speed based on the steering angle acquired at Step S1.

Next, at Step S23, the torque reduction amount determinator 53 determines whether the absolute value of the steering speed is decreasing.

As a result, if the absolute value of the steering speed is not decreasing (i.e., if the absolute value of the steering speed is increasing or not changed), the processing then transits to Step S24 where the torque reduction amount determinator 53 acquires a target additional deceleration based on the steering speed. This target additional deceleration is a deceleration to be added to the vehicle according to the steering operation in order to accurately achieve the vehicle behavior which the operator intended.

For example, the torque reduction amount determinator 53 acquires the target additional deceleration corresponding to the steering speed calculated at Step S22 based on the relation between the target additional deceleration and the steering speed which are illustrated in the map of FIG. 5.

Note that the horizontal axis in FIG. 5 indicates the steering speed, and the vertical axis indicates the target additional deceleration. As illustrated in FIG. 5, if the steering speed is below a threshold Ts (e.g., 10 deg/s), a corresponding target additional deceleration is zero (0). That is, if the steering speed is below the threshold Ts, the control for adding the deceleration to the vehicle according to the steering operation is not performed.

On the other hand, if the steering speed is above the threshold Ts, the target additional deceleration corresponding to the steering speed gradually approaches a given upper limit $D_{max}$ (e.g., 1 m/s$^2$) as the steering speed increases. That is, the target additional deceleration increases as the steering speed increases, but a rate of the increase becomes less.

Next, at Step S25, the torque reduction amount determinator 53 determines the additional deceleration in the current processing within a range where the increasing rate of the additional deceleration becomes below a threshold Rmax (e.g., 0.5 m/s$^3$).

For example, if the increasing rate from the additional deceleration determined in the previous processing to the target additional deceleration determined at Step S24 in the current processing is below Rmax, the torque reduction amount determinator 53 determines the target additional deceleration determined at Step S24 as the additional deceleration in the current processing On the other hand, if the rate of change from the additional deceleration determined in the previous processing to the target additional deceleration determined at Step S24 in the current processing is above Rmax, the torque reduction amount determinator 53 determines a value which is obtained by increasing the additional deceleration determined in the previous processing by the increasing rate Rmax for a period between the previous processing and the current processing, as the additional deceleration in the current processing.

At Step S23, if the absolute value of the steering speed is decreasing, the processing then transits to Step S26 where the torque reduction amount determinator 53 determines the additional deceleration determined in the previous processing as the additional deceleration in this processing. That is, if the absolute value of the steering speed is decreasing, the additional deceleration when the steering speed is the maximum (i.e., the maximum value of the additional deceleration) is maintained.

At Step S21, if the absolute value of the steering angle is not increasing (i.e., constant or decreasing), the processing then transits to Step S27 where the torque reduction amount determinator 53 acquires a decreasing amount in the current processing from the additional deceleration determined in the previous processing (a deceleration reduction amount). This deceleration reduction amount may be calculated based on a fixed rate of decrease which is stored beforehand in the memory etc. (e.g., 0.3 m/s$^3$). Alternatively, the deceleration reduction amount may be calculated based on a rate of decrease determined according to the operating state of the vehicle acquired at Step S1 and/or the steering speed calculated at Step S22.

At Step S28, the torque reduction amount determinator 53 determines the additional deceleration in the current processing by subtracting the deceleration reduction amount acquired at Step S27 from the additional deceleration determined in the previous processing.

After Step S25, S26 or S28, the torque reduction amount determinator 53 determines at Step S29 the torque reduction amount based on the current additional deceleration determined at Step S25, S26 or S28. For example, the torque reduction amount determinator 53 determines the torque reduction amount which is needed in order to achieve the current additional deceleration based on the current vehicle speed and gear position, road surface slope, etc. which are acquired at Step S1. After Step S29, the torque reduction amount determinator 53 ends the torque reduction amount determination processing, and returns to the main routine.

Returning to FIG. 3, after performing the processings at Steps S2-S4 and the torque reduction amount determination processing at Step S5, the final target torque determinator 55 determines at Step S6 the final target torque by subtracting the torque reduction amount determined in the torque reduction amount determination processing at Step S5 from the basic target torque after the smoothing at Step S4.

Next, at Step S7, the engine controller 59 determines the target air amount and a target equivalence ratio so that the engine 10 outputs the final target torque determined at Step S6. Here, the "air amount" is an amount of air introduced into the combustion chamber 11 of the engine 10. Note that a filling efficiency which is obtained by converting the air amount into a no-dimensional value may instead be used.

For example, the engine controller 59 calculates a target indicated torque which is obtained from the final target torque in consideration of a torque loss caused by a friction loss and/or a pumping loss, calculates a target generated heat amount required for generating the target indicated torque, and determines the target air amount based on the target generated heat amount and the target equivalence ratio.

Next, at Step S8, the engine controller 59 determines the valve opening of the throttle valve 5, and the open and close timings of the intake valve 12 through the variable intake valve mechanism 18 in consideration of the air amount detected by the airflow sensor 31 so that air of the target air amount determined at Step S7 is introduced into the engine 10.

Next, at Step S9, the engine controller 59 controls the throttle valve 5 and the variable intake valve mechanism 18 based on the throttle opening, and the open and close timings of the intake valve 12 determined at Step S8, and controls the fuel injector 13 based on the target equivalence ratio determined at Step S7 and an actual air amount estimated based on the detection signal S131 of the airflow sensor 31, etc.

Next, at Step S10, the engine controller 59 determines the existence of a demand of the torque reduction based on the operating state of the vehicle other than accelerator pedal operation. For example, the engine controller 59 determines that the demand of the torque reduction exists if the torque reduction amount determined in the torque reduction amount determination processing at Step S5 is above zero.

As a result, if there is the demand of the torque reduction, the processing then transits to Step S11 where the engine controller 59 determines a torque reduction ignition timing so that the engine 10 outputs the final target torque, based on the final target torque determined at Step S6, and the actual air amount actually introduced into the combustion chamber 11 by the control of the throttle valve 5 and the variable intake valve mechanism 18 at Step S9.

For example, the engine controller 59 estimates the actual air amount based on the detection signal S131 of the airflow sensor 31, etc. Then, the engine controller 59 selects an ignition advance map corresponding to the actual air amount which is estimated and the engine speed from the ignition advance maps (created beforehand and stored in the memory etc.) which define the relation between the ignition timing and the indicated torque for various air amounts and various engine speeds, and determines as torque reduction ignition timing, the ignition timing corresponding to the target indicated torque which is calculated at Step S7 while referring to the selected ignition advance map.

As illustrated in FIG. 6, the ignition advance map has a horizontal axis as the ignition timing and a vertical axis as the indicated torque, and is expressed by an upwardly convex curve where the indicated torque decreases as the ignition timing is advanced or retarded, having a local maximum of the indicated torque when the ignition timing is at MBT (Minimum Advance for Best Torque).

If the response of the actual air amount is delayed with respect to the reduction of the target air amount corresponding to the torque reduction demand, and the actual air amount is excessive against the target air amount, the indicated torque (illustrated by a solid line in FIG. 6) at $MBT_R$ in the ignition advance map corresponding to the actual air amount is larger than the indicated torque (illustrated by a dotted line in FIG. 6) at $MBT_S$ in the ignition advance map corresponding to the target air amount. In other words, an ignition timing $Ig_R$ (i.e., a torque reduction ignition timing) corresponding to a target indicated torque Tr in the ignition advance map corresponding to the actual air amount is retarded from an ignition timing $Ig_S$ corresponding to the target indicated torque Tr in the ignition advance map corresponding to the target air amount. The torque reduction ignition timing is shifted to the retard side as the actual air amount becomes more excessive against the target air amount.

Next, at Step S12, the engine controller 59 controls the ignition plug 14 so that ignition is performed at the torque reduction ignition timing determined at Step S11.

At Step S10, if there is no demand of the torque reduction, the processing then transits to Step S13 where the engine controller 59 controls the ignition plug 14 so that ignition is performed at an ignition timing (i.e., a basic ignition timing) with the most sufficient combustion efficiency corresponding to the actual air amount which is actually introduced into the combustion chamber 11 by the control of the throttle valve 5 and the variable intake valve mechanism 18 at Step S9.

For example, the engine controller 59 selects one of the ignition timings on the retard side as the basic ignition timing, from MBT in the ignition advance map corresponding to the actual air amount and engine speed, and a knock critical point ignition timing corresponding to the actual air amount and engine speed, and controls the ignition plug 14 based on the selected ignition timing.

After Step S12 or S13, the PCM 50 ends the engine control processing.

Next, operation of the engine control device according to this embodiment of the present invention is described with reference to FIG. 7, which illustrates a diagram and graphs of changes in parameters with time during the engine control by the engine control device when the vehicle carrying the engine control device according to this embodiment of the present invention turns.

Figure 7:
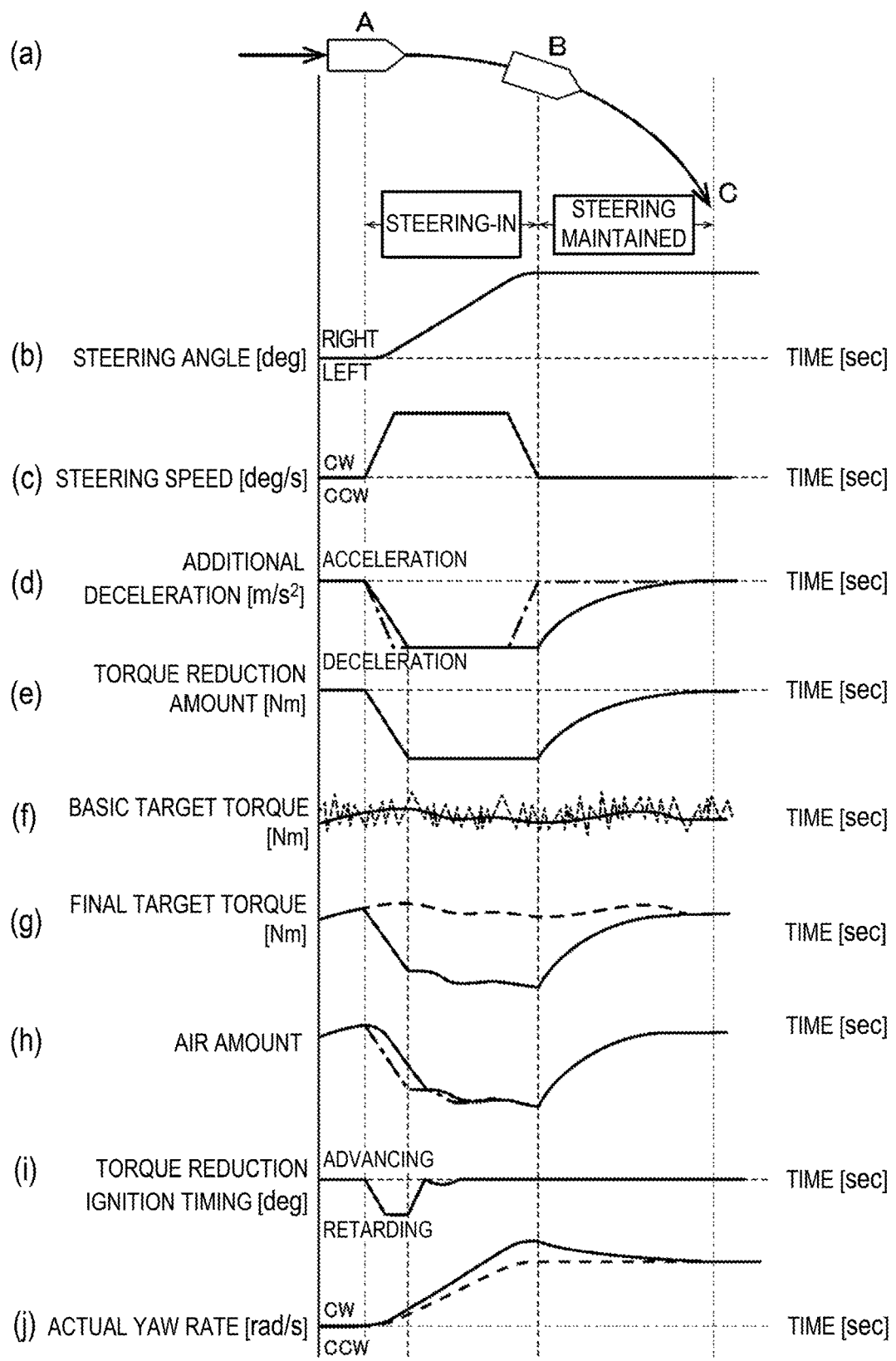
FIG. 7 illustrates a diagram and graphs of changes in parameters with time during the engine control by the engine control device when a vehicle equipped with the engine control device according to the embodiment of the present invention turns, where a part (a) is a plan view schematically illustrating a vehicle which makes a turn to the right, a part (b) is a graph illustrating a change in a steering angle of the vehicle which makes a turn to the right as illustrated in the part (a), a part (c) is a graph illustrating a change in a steering speed of the vehicle which makes a turn to the right as illustrated in the part (b), a part (d) is a graph illustrating a change in an additional deceleration which is determined based on the steering speed illustrated in the part (c), a part (e) is a graph illustrating a change in a torque reduction amount which is determined based on the additional deceleration illustrated in the part (d), a part (f) is a graph illustrating a change in a basic target torque before and after a smoothing by a torque change filter, a part (g) is a graph illustrating a change in a final target torque which is determined based on the basic target torque and the torque reduction amount, a part (h) is a graph illustrating changes in the target air amount which is determined based on the final target torque and an actual air amount, a part (i) is a graph illustrating a torque reduction ignition timing which is determined based on the final target torque and the actual air amount, with respect to a basic ignition timing, and a part (j) is a graph illustrating a change in a yaw rate (actual yaw rate) which is caused in the vehicle when the control of the intake air amount and the ignition timing is performed as illustrated in the parts (h) and (i), and a change in an actual yaw rate when the control of the air amount and the ignition timing based on the torque reduction amount which is determined by the torque reduction amount determinator is not performed.

A part (a) of FIG. 7 is a plan view schematically illustrating the vehicle which makes a turn to the right. As illustrated in the part (a), the vehicle starts a turn to the right from a position A, and then continues the right turn at a fixed steering angle from a position B to a position C.

A part (b) of FIG. 7 is a graph illustrating a change in the steering angle of the vehicle which makes the turn to the right as illustrated in the part (a). In the part (b), the horizontal axis indicates time and the vertical axis indicates the steering angle.

As illustrated in the part (b), a rightward steering is started at the position A, a rightward steering angle increases gradually by performing an additional steering operation, and the rightward steering angle becomes the maximum at the position B. The steering angle is then kept constant at the position C (steering maintained).

A part (c) of FIG. 7 is a graph illustrating a change in a steering speed of the vehicle which makes the turn to the right as illustrated in the part (b). In the part (c), the horizontal axis indicates time and the vertical axis indicates the steering speed.

The steering speed of the vehicle is expressed by a derivative of the steering angle of the vehicle with respect to time. That is, as illustrated in the part (c), when the rightward steering is started at the position A, a rightward steering speed occurs, and the steering speed is kept almost constant between the position A and the position B. Then, the rightward steering speed decreases, and the steering speed becomes zero when the rightward steering angle reaches the maximum at the position B. Furthermore, the steering speed remains at zero while the rightward steering angle is maintained from the position B to the position C.

A part (d) of FIG. 7 is a graph illustrating a change in the additional deceleration which is determined based on the steering speed illustrated in the part (c). In the part (d), the horizontal axis indicates time and the vertical axis indicates the additional deceleration. Moreover, the solid line in the part (d) illustrates a change in the additional deceleration determined in the torque reduction amount determination processing of FIG. 4, and a dotted chain line illustrates a change in the target additional deceleration based on steering speed. The target additional deceleration illustrated by a one-point chain line begins to increase from the position A, is kept almost constant between the position A and the position B, and then decreases to reach zero at the position B, similar to the change in the steering speed illustrated in the part (c).

As described with reference to FIG. 4, the torque reduction amount determinator 53 acquires the target additional deceleration based on the steering speed at Step S24 if the absolute value of the steering speed is not decreasing at Step S23 (i.e., if the absolute value of the steering speed is increasing or the absolute value of the steering speed is not changing). Then, at Step S25, the torque reduction amount determinator 53 determines the additional deceleration in each processing cycle within a range where an increasing rate of the additional deceleration becomes below the threshold Rmax.

The part (d) of FIG. 7 illustrates a case where the increasing rate of the target additional deceleration which starts increasing from the position A exceeds the threshold Rmax. In that case, the torque reduction amount determinator 53 increases the additional deceleration so that the increasing rate equals to Rmax (i.e., a less increasing rate than the target additional deceleration illustrated by the one-point chain line). Moreover, if the target additional deceleration is kept almost constant between the position A and the position B, the torque reduction amount determinator 53 determines that the addition decelerating equals to the target additional deceleration.

Moreover, as described above, if the absolute value of the steering speed is decreasing at Step S23 in FIG. 4, the torque reduction amount determinator 53 maintains the additional deceleration of the maximum steering speed. In the part (d) of FIG. 7, if the steering speed is decreasing toward the position B, the target additional deceleration illustrated by the one-point chain line also decreases accordingly, but the additional deceleration illustrated by the solid line maintains its maximum value until the position B.

Furthermore, as described above, at Step S21 in FIG. 4, if the absolute value of the steering angle is constant or decreasing, the torque reduction amount determinator 53 acquires the deceleration reduction amount at Step S27, and then decreases the additional deceleration by the deceleration reduction amount. As illustrated in the part (d), the torque reduction amount determinator 53 decreases the additional deceleration so that the decreasing rate of the additional deceleration becomes gradually smaller (i.e., so that the slope of the solid line which illustrates the change in the additional deceleration becomes gradually gentler or less steep.)

A part (e) of FIG. 7 is a graph illustrating a change in the torque reduction amount which is determined based on the additional deceleration illustrated in the part (d). In the part (e), the horizontal axis indicates time and the vertical axis indicates the torque reduction amount.

As described above, the torque reduction amount determinator 53 determines the torque reduction amount which is needed for achieving the additional deceleration based on parameters, such as the current vehicle speed, gear position, and road surface slope. Therefore, if these parameters are constant, the torque reduction amount is determined so as to change similar to the change in the additional deceleration illustrated in the part (d).

A part (f) of FIG. 7 is a graph illustrating a change in the basic target torque before and after a smoothing by the torque change filter 57. In the part (f), the horizontal axis indicates time and the vertical axis indicates the torque. Moreover, in the part (f), a dotted line illustrates the basic target torque before smoothing by the torque change filter 57, and a solid line illustrates the basic target torque after the smoothing by the torque change filter 57.

The basic target torque determined such as to achieve the target acceleration determined based on the accelerator opening, speed, gear position, etc. may have a steep change due to various kinds of disturbances, noises, etc., as illustrated by the dotted line in the part (f). Since the basic target torque is smoothed by the torque change filter 57, a steep change is controlled as illustrated by the solid line in the part (f) and, thus a rapid acceleration and/or deceleration of the vehicle is controlled.

A part (g) of FIG. 7 is a graph illustrating a change in the final target torque which is determined based on the basic target torque and the torque reduction amount. In the part (g), the horizontal axis indicates time and the vertical axis indicates the torque. Moreover, in the part (g), a dotted line illustrates the basic target torque after the smoothing illustrated in the part (f), and a solid line illustrates the final target torque.

As described with reference to FIG. 3, the final target torque determinator 55 determines the final target torque by subtracting the torque reduction amount determined in the torque reduction amount determination processing at Step S5 from the basic target torque after the smoothing at Step S4.

That is, when the following travel control is performed by the following travel control device 60, the final target torque is determined by subtracting the torque reduction amount from the basic target torque even if the basic target torque is determined in order to achieve the target acceleration specified by the following travel control device 60. Thus, as illustrated by the solid line in the part (g), the torque reduction amount is reflected in the final target torque as it is, without being influenced by the following travel control.

A part (h) of FIG. 7 is a graph illustrating changes in the target air amount which is determined based on the final target torque and the actual air amount. In the part (h), the horizontal axis indicates time and the vertical axis indicates the air amount. Moreover, a one-point chain line in the part (h) illustrates the target air amount corresponding to the final target torque illustrated in the part (g), and a solid line illustrates the actual air amount actually introduced into the combustion chamber 11 by the control of the throttle valve 5 and the variable intake valve mechanism 18 according to the final target torque.

As illustrated in the part (h), the target air amount changes synchronizing with the change in the final target torque with time, but a delay occurs in the response of the actual air amount against the change in the target air amount. That is, the actual air amount becomes excessive when the target air amount decreases, and the actual air amount is insufficient when the target air amount increases.

A part (i) of FIG. 7 is a graph illustrating the torque reduction ignition timing which is determined based on the final target torque and the actual air amount, with respect to the basic ignition timing. In the part (i), the horizontal axis indicates time and the vertical axis indicates the ignition timing with respect to the basic ignition timing (advancing is positive and retarding is negative).

As illustrated in the part (h), since a delay occurs in the response of the actual air amount and the actual air amount becomes excessive against the target air amount when the target air amount decreases according to the decrease of the final target torque, the decrease of the final target torque cannot be achieved by the decreasing amount of the actual air amount alone. Thus, the decrease of the final target torque is achieved by retarding the torque reduction ignition timing from the basic ignition timing based on the final target torque and the actual air amount.

A part (j) of FIG. 7 is a graph illustrating a change in a yaw rate (actual yaw rate) which is caused in the vehicle when the engine 10 is controlled so as to achieve the final target torque illustrated in the part (g), and a change in an actual yaw rate when the control corresponding to the torque reduction amount illustrated in the part (e) is not performed (i.e., when the engine 10 is controlled so as to achieve the basic target torque after the smoothing illustrated by the dotted line in the part (g)), in the vehicle where the steering as illustrated in the part (b) is performed. In the part (j), the horizontal axis indicates time and the vertical axis indicates the yaw rate. Moreover, a solid line in the part (j) illustrates a change in the actual yaw rate when the engine 10 is controlled so as to achieve the final target torque, and a dotted line illustrates a change in the actual yaw rate when the control corresponding to the torque reduction amount is not performed.

A rightward steering is started at the position A, and when the torque reduction amount is increased as illustrated in the part (e) according to an increase of the rightward steering speed, a load to the front wheels which are steerable wheels of the vehicle increases. As a result, since the frictional force between the front wheels and the road surface increases and the cornering force of the front wheels increases, a turnability of the vehicle improves. That is, between the position A and the positions B as illustrated in the part (j), the yaw rate in the clockwise direction (CW) generated on the vehicle becomes larger when the engine 10 is controlled so as to achieve the final target torque reflecting the torque reduction amount (solid line), than when the control corresponding to the torque reduction amount is not performed (dotted line).

Moreover, as illustrated in the parts (d) and (e), the target additional deceleration also decreases when the steering speed decreases toward the position B, but since the maximum torque reduction amount is maintained, the load applied to the front wheels is maintained while the steering-in is continued and, thus, the turnability of the vehicle is maintained.

Furthermore, when the absolute value of the steering angle is constant at the position C from the position B, since the torque reduction amount is smoothly decreased, the load applied to the front wheels is gradually reduced in response to the end of the steering-in, and the output torque of the engine 10 is recovered while stabilizing the vehicle body by decreasing the cornering force of the front wheels.

Next, further modifications of this embodiment of the present invention are described.

Although in the above embodiment, the torque reduction amount determinator 53 acquires the target additional deceleration based on the steering speed, and determines the torque reduction amount based on the target additional deceleration. Alternatively, the torque reduction amount may be determined based on the operating state of the vehicle other than accelerator pedal operation, such as the steering angle, and/or the yaw rate.

For example, the torque reduction amount determinator 53 may calculate a target yaw acceleration to be generated on the vehicle based on the target yaw rate calculated based on the steering angle and the vehicle speed, or the yaw rate inputted from the yaw rate sensor, and acquire the target additional deceleration based on the target yaw acceleration to determine the torque reduction amount. Alternatively, the lateral acceleration generated with revolution of the vehicle is detected by an acceleration sensor, and the torque reduction amount may be determined based on this lateral acceleration. Alternatively, the torque reduction amount determinator 53 may determine the torque reduction amount based on a demand different from the target additional deceleration (e.g., a torque required for cancelling vibration of a power train during acceleration or deceleration).

Moreover, in the above embodiment, the following travel control device 60 inputs the control signal S160 corresponding to the target acceleration for following the vehicle after the preceding vehicle into the PCM 50. Along with the control signal S160 from the following travel control device 60, a control signal may also be inputted from the vehicle speed control device which controls the engine 10 so as to maintain a given vehicle speed. Also in this case, since the final target torque is determined by subtracting the torque reduction amount from the basic target torque, the torque reduction amount is reflected in the final target torque as it is, without being influenced by the vehicle speed control.

Next, effects of the engine control device according to the embodiment of the present invention and the modifications of the embodiment of the present invention described above are described.

First, the engine controller 59 determines the target air amount so that the engine 10 outputs the final target torque, controls the throttle valve 5 and the variable intake valve mechanism 18 so as to achieve the target air amount, and retards the ignition timing of the ignition plug 14 more as the actual air amount becomes more excessive against the target air amount. Thus, even if the actual air amount becomes excessive against the target air amount due to the delay in response of the actual air amount when the target air amount decreases according to the decrease of the final target torque, and the decrease of the final target torque cannot be achieved by the decreasing of the actual air amount alone, the output torque can be reduced by retarding the ignition timing. Therefore, the decrease of the final target torque according to the change in the torque reduction amount can be achieved. Therefore, the engine 10 can be controlled so that the torque reduction amount is obtained with a high response with respect to the operating state of the vehicle other than the accelerator pedal operation, the load can be quickly applied to the front wheels, and the vehicle behavior which the operator intended can accurately be achieved.

Particularly, if the torque reduction amount is above zero, the engine controller 59 controls the ignition system so that ignition is performed at an ignition timing for achieving the final target torque under the operating state of the engine including the actual air amount and the engine speed at the time point. If the torque reduction amount is zero, the engine controller 59 controls the ignition system so that ignition is performed at the given basic ignition timing for the operating state of the engine including the actual air amount and the engine speed at the time point. Thus, only when there is a torque reduction demand according to the operating state of the vehicle other than accelerator pedal operation, the ignition timing can be retarded according to the final target torque and the actual air amount. Therefore, a degradation of the fuel consumption due to retarding of the ignition timing can be minimized, while accurately achieving the vehicle behavior which the operator intended.

Moreover, since the torque reduction amount determinator 53 determines the torque reduction amount according to the steering operation of the vehicle, the change in the torque reduction amount with time which is determined based on the steering operation can be reflected in the change in the final target torque with time. Accordingly, the load can be applied to the front wheels by quickly adding the deceleration according to the operator's steering operation to the vehicle, the response to the steering operation can be improved by quickly increasing the cornering force, and the engine 10 can be controlled to accurately achieve the vehicle behavior which the operator intended.

Moreover, the final target torque determinator 55 determines the final target torque based on the basic target torque determined based on the target acceleration of the vehicle, and the torque reduction amount determined based on the operating state of the vehicle other than accelerator pedal operation. In addition, the engine controller 59 controls the engine 10 so as to output the final target torque. Thus, the change in the torque reduction amount can be reflected in the final target torque, regardless of what kind of driving operation or control is used for determining the basic target torque. Therefore, the load can quickly be applied to the front wheels by controlling the engine 10 so that the torque reduction amount is obtained with a high response with respect to the operating state of the vehicle other than accelerator pedal operation, and the vehicle behavior which the operator intended can accurately be achieved, while appropriately cooperating with other driving force controls.

Particularly, the basic target torque determinator 51 determines the basic target torque based on the target acceleration determined by the vehicle speed control device of the following travel control device 60, etc. Since the final target torque determinator 55 determines the final target torque based on the basic target torque and the torque reduction amount determined based on the operating state of the vehicle other than accelerator pedal operation, and the engine controller 59 controls the engine 10 so as to output the final target torque, the vehicle behavior which the operator intended can accurately be achieved even when the vehicle speed control is performed by the following travel control device 60, etc.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Intake Passage
5 Throttle Valve
10 Engine
13 Fuel Injector
14 Ignition Plug
18 Variable Intake Valve Mechanism
25 Exhaust Passage
30 Accelerator Opening Sensor
39 Vehicle Speed Sensor
50 PCM
51 Basic Target Torque Determinator
53 Torque Reduction Amount Determinator
55 Final Target Torque Determinator
57 Torque Change Filter
59 Engine Controller
60 Following Travel Control Device
100 Engine System

What is claimed is:

1. An engine control device for controlling an engine based on a plurality of operating states of a vehicle, the engine control device comprising:
    a processor configured to execute software programs stored in a non-volatile memory of the engine control device, said software programs including:
        a basic target engine torque determinator for setting a target acceleration of the vehicle based on a first operating state of the vehicle, said first operating state of the vehicle being defined by an accelerator pedal operation, and determining a basic target engine torque based on the target acceleration of the vehicle;
        an actual engine torque reduction demand determinator for determining an existence of a demand to reduce an actual engine torque based on a second operating state of the vehicle, said second operating state of the vehicle being defined by a steering wheel operation;
        an actual engine torque reduction amount determinator for determining an actual engine torque reduction amount when the demand to reduce the actual engine torque is determined to exist, the determined actual engine torque reduction amount being based at least in part on a calculated steering speed;
        a final target engine torque determinator for determining a final target engine torque, wherein the determined final target engine torque is obtained by subtracting the determined actual engine torque reduction amount from the determined basic target engine torque; and
        an engine controller for adjusting at least one of a throttle valve position, a fuel injection amount and a fuel injection timing of a fuel injector, an ignition timing of an ignition plug, and open-close timings of an intake valve and an exhaust valve such that the actual engine torque is reduced so as to output the determined final target engine torque.

2. The engine control device of claim 1, further comprising a following travel control device for controlling a traveling speed of the vehicle by performing a following travel control, the following travel control including detecting a distance between the vehicle and a preceding vehicle via a radar, and setting the target acceleration of the of the vehicle such that the distance between the vehicle and the preceding vehicle is kept constant,
    wherein when the demand to reduce the actual engine torque is determined to exist, even during the performing of the following travel control, the final target engine torque determinator still determines the final target engine torque by subtracting the determined actual engine torque reduction amount from the determined basic target engine torque.

3. An engine control device for controlling an engine based on a plurality of operating states of a vehicle, the engine control device comprising:
a processor configured to execute software programs stored in a non-volatile memory of the engine control device, said software programs including:
a basic target engine torque determinator for setting a target acceleration of the vehicle based on a first operating state of the vehicle, said first operating state of the vehicle being defined by an accelerator pedal operation, and determining a basic target engine torque based on the target acceleration of the vehicle;
a change rate acquirer for acquiring a rate of change of a steering speed of the vehicle based on a second operating state of the vehicle, said second operating state of the vehicle being defined by a steering wheel operation;
a target additional deceleration setter for increasing a target additional deceleration, the target additional deceleration being defined by a deceleration amount that is added to the vehicle according to the acquired rate of change of the steering speed of the vehicle, and wherein a rate of the increase of the target additional deceleration lessens as the rate of change of the steering speed of the vehicle increases;
an actual engine torque reduction amount determinator for determining an actual engine torque reduction amount according to the target additional deceleration when an actual engine torque reduction demand is determined to exist;
a final target engine torque determinator for determining a final target engine torque, wherein the determined final target engine torque is obtained by subtracting the determined actual engine torque reduction amount from the determined basic target engine torque; and
an engine controller for adjusting at least one of a throttle valve position, a fuel injection amount and a fuel injection timing of a fuel injector, an ignition timing of an ignition plug, and open-close timings of an intake valve and an exhaust valve such that the actual engine torque is reduced so as to output the determined final target engine torque.

* * * * *